US012748630B2

(12) United States Patent
Sinks et al.

(10) Patent No.: US 12,748,630 B2
(45) Date of Patent: Sep. 29, 2026

(54) DISTRIBUTED ARTIFICAL INTELLIGENCE WORKLOAD OPTIMIZER

(71) Applicant: Bank of America Corporation, Charlotte, NC (US)

(72) Inventors: Steven Sinks, Scottsdale, AZ (US); Joshua Abraham, Sharon, MA (US)

(73) Assignee: Bank of America Corporation, Charlotte, NC (US)

( * ) Notice: Subject to any disclaimer, the term of this patent is extended or adjusted under 35 U.S.C. 154(b) by 540 days.

(21) Appl. No.: 18/133,849

(22) Filed: Apr. 12, 2023

(65) Prior Publication Data

US 2024/0345885 A1 Oct. 17, 2024

(51) Int. Cl.
*G06F 9/46* (2006.01)
*G06F 9/50* (2006.01)

(52) U.S. Cl.
CPC .......... *G06F 9/5038* (2013.01); *G06F 9/5083* (2013.01); *G06F 2209/501* (2013.01); *G06F 2209/503* (2013.01); *G06F 2209/506* (2013.01)

(58) Field of Classification Search
CPC ................. G06F 9/5038; G06F 9/5083; G06F 2209/501; G06F 2209/503; G06F 2209/506
See application file for complete search history.

(56) References Cited

U.S. PATENT DOCUMENTS 7,127,716 B2 10/2006 Jin et al.
8,643,656 B2 2/2014 Li et al.
8,683,418 B2 3/2014 Bose et al.
8,914,515 B2 12/2014 Alapati et al.
9,135,077 B2 9/2015 Schmit et al.
9,389,668 B2 7/2016 Zhou et al.
9,521,151 B2 12/2016 Kinsella et al.
10,511,540 B1 * 12/2019 Norbeck, Jr. ......... H04L 47/803
11,740,942 B2 * 8/2023 Kumar ................. G06F 9/5044
718/104

(Continued)

OTHER PUBLICATIONS

Joloudari et al., Resource allocation optimization using AI methods in various computing paradigms: A review, Mar. 2022, Research Gate, 21 pages. (Year: 2022).*

*Primary Examiner* — Diem K Cao
(74) *Attorney, Agent, or Firm* — Banner & Witcoff, Ltd.

(57) ABSTRACT

Arrangements for a distributed artificial intelligence workload optimizer are provided. In some aspects, a workload that identifies a number of computer processing cycles required to complete a task may be received. Processing constraints may be received from a user computing device. Contextual parameters associated with the workload may be received. Availability data for a plurality of resources in a distributed computing environment, each capable of performing at least part of the workload, may be acquired. Using an artificial intelligence algorithm, an optimization model for distributing the workload may be built based on the processing constraints, the contextual parameters, and the availability data. The optimization model may optimize the distribution of available resources allocated to executing the workload. Based on the optimization model, resource distribution options including an optimal distribution of the available resources for executing the workload may be identified, and the workload may be executed accordingly.

20 Claims, 11 Drawing Sheets

(56) References Cited

U.S. PATENT DOCUMENTS

| | | | |
|---|---|---|---|
| 2008/0155100 | A1 | 6/2008 | Ahmed et al. |
| 2010/0250876 | A1 | 9/2010 | Wang et al. |
| 2011/0161964 | A1 | 6/2011 | Piazza et al. |
| 2011/0185064 | A1 | 7/2011 | Head et al. |
| 2011/0213508 | A1 | 9/2011 | Mandagere et al. |
| 2011/0238458 | A1 | 9/2011 | Purcell et al. |
| 2012/0005685 | A1 | 1/2012 | Chen et al. |
| 2012/0222042 | A1 | 8/2012 | Chess et al. |
| 2012/0284410 | A1 | 11/2012 | Dudek et al. |
| 2013/0111035 | A1 | 5/2013 | Alapati et al. |
| 2013/0152047 | A1 | 6/2013 | Moorthi et al. |
| 2014/0325076 | A1 | 10/2014 | Madduri et al. |
| 2015/0277987 | A1* | 10/2015 | Di Balsamo .......... G06F 9/5083 718/104 |
| 2016/0055612 | A1 | 2/2016 | Barik et al. |
| 2022/0100578 | A1* | 3/2022 | Moreira Martins .... G06F 9/505 |
| 2023/0127026 | A1* | 4/2023 | Schulz ............... G05B 19/4185 700/100 |
| 2023/0367653 | A1* | 11/2023 | Kumbhare ................ G06F 1/26 |
| 2024/0202017 | A1* | 6/2024 | Kumar ................ G06F 9/45558 |

* cited by examiner

DISTRIBUTED ARTIFICAL INTELLIGENCE WORKLOAD OPTIMIZER

BACKGROUND

Aspects of the disclosure generally relate to computer systems and networks. In particular, one or more aspects of the disclosure relate to a distributed artificial intelligence (AI) workload optimizer intelligently optimizing workload distribution among computing resources.

Systems are increasingly tasked with demanding workloads. Central processing units (CPUs) or graphics processing units (GPUs) are fundamental computing engines that are typically used to complete a workload or a computational task. Efficient use of computing resources, such as processing power, memory capability, or network bandwidth may be difficult and present various technical challenges. For example, it may be difficult to maximize the distributed resources of cloud/GPU computing across one or more vendors at scale.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with intelligently optimizing workload distribution among computing resources.

In accordance with one or more embodiments, a computing platform having at least one processor, a communication interface, and memory may receive a workload. In addition, the workload may identify a number of computer processing cycles required to complete a task. The computing platform may receive, from a computing device associated with a user, one or more processing constraints. The computing platform may receive one or more contextual parameters associated with the workload. The computing platform may acquire availability data for a plurality of resources in a distributed computing environment. In addition, each of the plurality of resources may be capable of performing at least part of the workload. Based on the one or more processing constraints, the one or more contextual parameters, and the availability data, the computing platform may build, using an artificial intelligence algorithm, an optimization model for distributing the workload. In addition, the optimization model may optimize distribution of available resources of the plurality of resources allocated to executing the workload. Based on the optimization model, the computing platform may identify one or more resource distribution options including an optimal distribution of the available resources for executing the workload. The computing platform may execute the workload based on the identified one or more resource distribution options.

In some aspects, acquiring the availability data for the plurality of resources may include identifying resources, of the plurality of resources, that are not being utilized.

In some embodiments, the computer processing cycles may include processing cycles of a central processing unit (CPU) or processing cycles of a graphical processing unit (GPU).

In some example arrangements, the one or more processing constraints may include a time interval and a target budget for completion of the task.

In some embodiments, the one or more processing constraints may include a regulatory requirement associated with the task.

In some arrangements, the one or more contextual parameters associated with the workload may include one or more of geographic information, weather related information, historical information, temporal information, or stock market information.

In some examples, the computing platform may, based on a type of the task, assign and apply weights to the optimization model to emphasize a selection of a central processing unit or a graphical processing unit for completing the task.

In some embodiments, the computing platform may determine a likelihood of completion of the workload within the one or more processing constraints, determine that the workload cannot be completed within the one or more processing constraints, and transmit a notification to the computing device associated with a user indicating the likelihood of completion of the workload outside the one or more processing constraints.

In some aspects, the computing platform may prompt a user of the computing device to select one of the identified one or more resource distribution options and execute the workload based on the selection by the user of the computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to a distributed artificial intelligence workload optimizer. In particular, one or more aspects of the disclosure provide the intelligence behind workload distribution (e.g., the most cost effective route) based on the programs and/or tools that are available to complete the work. Additional aspects of the disclosure may receive input from a user and leverage artificial intelligence and/or machine learning (AI/ML) algorithms or models to spin up cloud solutions across single or multiple providers, and produce the solution within various constraints (e.g., within a requested time period, within a specific cost or cost range, taking into account speed versus cost tradeoff considerations, and/or the like). Further aspects of the disclosure may adjust resources in use or make adjustments across platforms based upon various requirements of a workload as needed.

These and various other arrangements will be discussed more fully below.

Figure 1A:
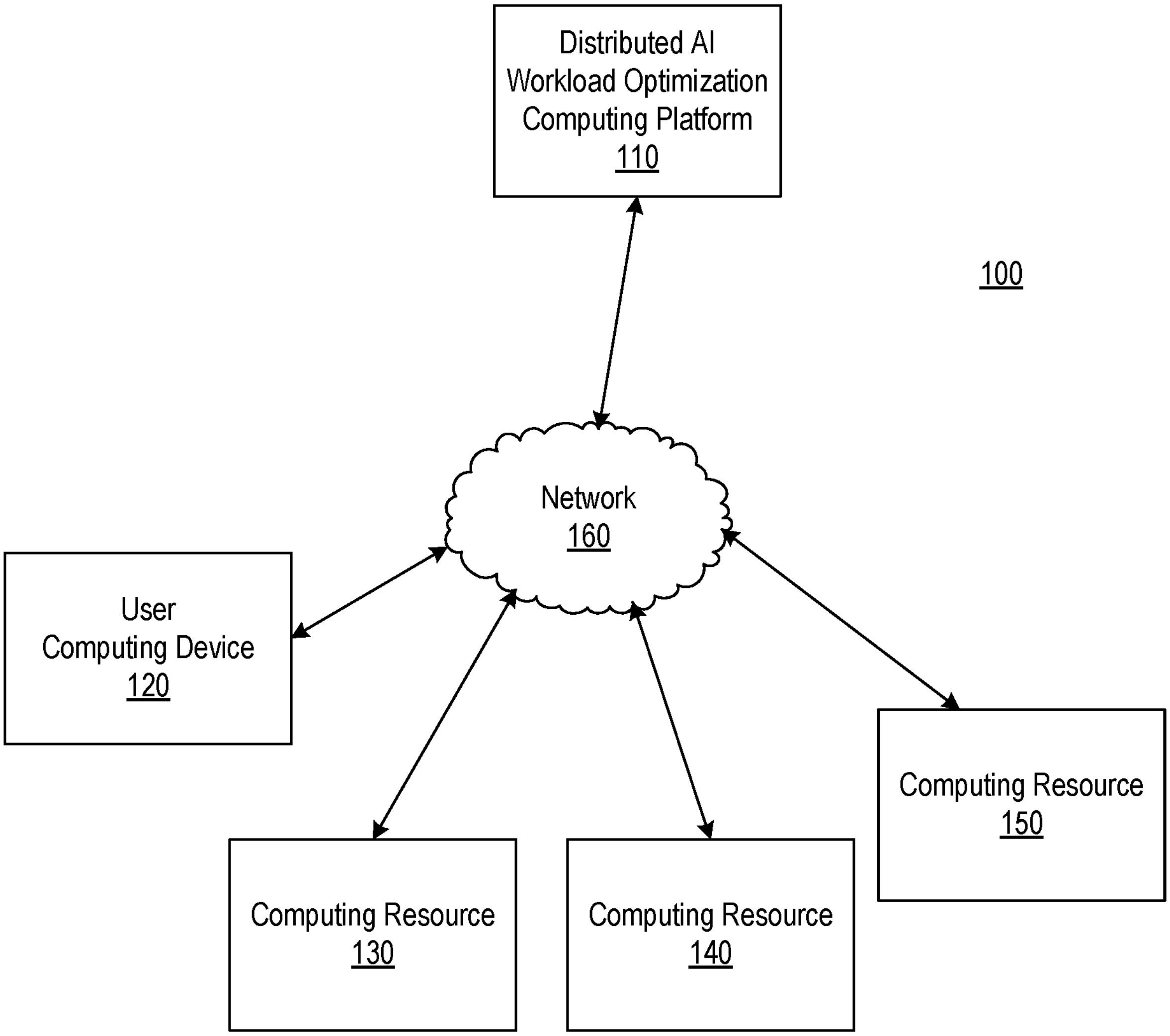
FIGS. 1A and 1B depict an illustrative computing environment for distributed AI workload optimization in accordance with one or more arrangements discussed herein.
Figure 1B:
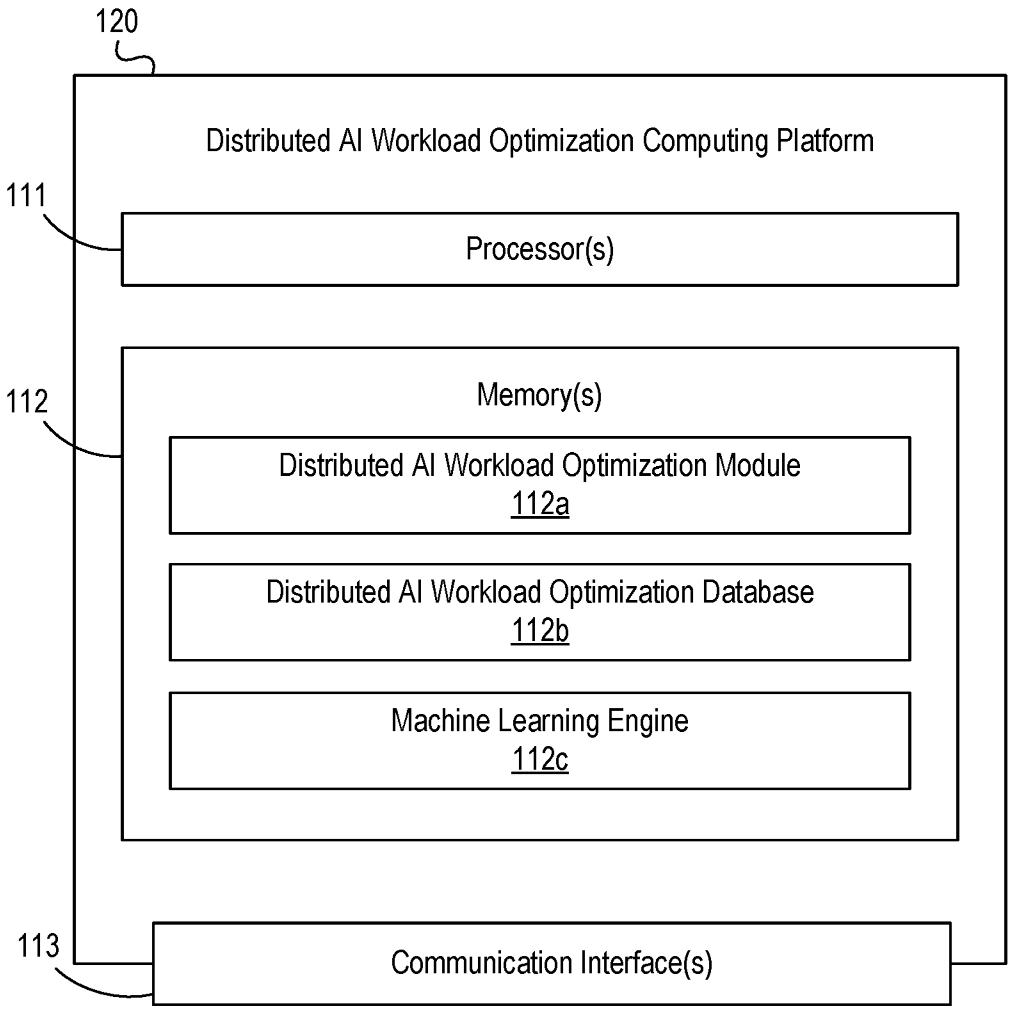

Aspects described herein may be implemented using one or more computing devices operating in a computing environment. For instance, FIGS. 1A and 1B depict an illustrative computing environment for distributed AI workload optimization in accordance with one or more example arrangements. Referring to FIG. 1A, computing environment 100 may include one or more computing devices and/or other computing systems. For example, computing environment 100 may include distributed AI workload optimization computing platform 110, user computing device 120, computing resource 130, computing resource 140, and computing resource 150. In some examples, computing environment 100 may be a distributed computing environment such as a cloud computing environment. Although one user computing device 120 and three computing resources 130, 140, 150 are shown, any number of devices or computing resources may be used without departing from the disclosure.

As described further below, distributed AI workload optimization computing platform 110 may include one or more computing devices configured to perform one or more of the functions described herein. For example, distributed AI workload optimization computing platform 110 may include one or more computers (e.g., laptop computers, desktop computers, servers, server blades, or the like) configured to perform distributed AI workload optimization and/or one or more other functions described herein. Among other functions, distributed AI workload optimization computing platform 110 efficiently optimizes the distributed resources of cloud/GPU computing across single or multiple vendors. For example, distributed AI workload optimization computing platform 110 may interact with multiple servers, multiple platforms, and/or multiple vendors, using AI, to distribute a workload based on various parameters (e.g., time, cost, context, or the like).

User computing device 120 may include one or more computing devices and/or other computer components (e.g., processors, memories, communication interfaces). For example, user computing device 120 may be a desktop computing device (e.g., desktop computer, terminal), or the like or a mobile computing device (e.g., smartphone, tablet, smart watch, laptop computer, or the like) used by users interacting with distributed AI workload optimization computing platform 110.

Computing resource 130 may be and/or include computer hardware and software (e.g., storage, processing power, databases, network connections, CPUs, GPUs, and/or the like). In some examples, computing resource 130 may include GPU specific resourcing within different environments, including a cloud environment, an on-premises environment, and/or internally hosted vendor based locations.

Computing resource 140 may be and/or include computer hardware and software (e.g., storage, processing power, databases, network connections, CPUs, GPUs, and/or the like). In some examples, computing resource 130 may include GPU specific resourcing within different environments, including a cloud environment, an on-premises environment, and/or internally hosted vendor based locations.

Computing resource 150 may be and/or include computer hardware and software (e.g., storage, processing power, databases, network connections, CPUs, GPUs, and/or the like). In some examples, computing resource 130 may include GPU specific resourcing within different environments, including a cloud environment, an on-premises environment, and/or internally hosted vendor based locations.

Computing environment 100 also may include one or more networks, which may interconnect one or more of distributed AI workload optimization computing platform 110, user computing device 120, computing resource 130, computing resource 140, and computing resource 150. For example, computing environment 100 may include a network 160 (which may, e.g., interconnect distributed AI workload optimization computing platform 110, user computing device 120, computing resource 130, computing resource 140, computing resource 150, and/or one or more other systems which may be associated with an enterprise organization, such as a financial institution, with one or more other systems, public networks, sub-networks, and/or the like).

In one or more arrangements, distributed AI workload optimization computing platform 110, user computing device 120, computing resource 130, computing resource 140, and computing resource 150 may be any type of computing device capable of performing at least part of a workload. For example, distributed AI workload optimization computing platform 110, user computing device 120, computing resource 130, computing resource 140, computing resource 150, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions as described herein.

Referring to FIG. 1B, distributed AI workload optimization computing platform 110 may include one or more processors 111, memory 112, and communication interface 113. A data bus may interconnect processor(s) 111, memory 112, and communication interface 113. Communication interface 113 may be a network interface configured to support communication between distributed AI workload optimization computing platform 110 and one or more networks (e.g., network 160, or the like). Memory 112 may include one or more program modules having instructions that when executed by processor(s) 111 cause distributed AI workload optimization computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of distributed AI workload optimization computing platform 110 and/or by different computing devices that may form and/or otherwise make up distributed AI workload optimization computing platform 110.

For example, memory 112 may have, store and/or include a distributed AI workload optimization module 112*a*, a distributed AI workload optimization database 112*b*, and a machine learning engine 112*c*. Distributed AI workload optimization module 112*a*, may have instructions that direct and/or cause distributed AI workload optimization computing platform 110 to, for instance, optimize the distributed resources of cloud computing across one or more vendors, and/or instructions that direct distributed AI workload optimization computing platform 110 to perform other functions, as discussed in greater detail below. Distributed AI workload optimization database 112*b* may store information used by distributed AI workload optimization module 112*a* and/or distributed AI workload optimization computing platform 110 in performing distributed AI workload optimization and/or in performing other functions, as discussed in greater detail below.

Machine learning engine 112*c* may use AI/ML algorithms to spin up cloud solutions across single or multiple providers and/or functional logic context. In some examples, the AI/ML algorithm may include natural language processing (NLP), abstract syntax trees (ASTs), clustering, and/or the like. Machine learning engine 112*c* may have instructions that direct and/or cause distributed AI workload optimization computing platform 110 to set, define, and/or iteratively redefine rules, techniques and/or other parameters used by distributed AI workload optimization computing platform 110 and/or other systems in computing environment 100 in taking input from a user and spinning up cloud solutions across single or multiple vendors and dynamically adjusting resource usage to meet specific constraints. In some examples, distributed AI workload optimization computing platform 110 may build and/or train one or more machine learning models. For example, memory 112 may have, store, and/or include historical/training data. In some examples, distributed AI workload optimization computing platform 110 may receive historical and/or training data and use that data to train one or more machine learning models stored in machine learning engine 112*c*. The historical and/or training data may include, for instance, historical workload execution data, and/or the like. The data may be gathered and used to build and train one or more machine learning models executed by machine learning engine 112*c* to identify one or more resource distribution options, including an optimal distribution of the available resources for executing the workload in accordance with current resources and given constraints, and/or perform other functions, as discussed in greater detail below. Various machine learning algorithms may be used without departing from the disclosure, such as supervised learning algorithms, unsupervised learning algorithms, abstract syntax tree algorithms, natural language processing algorithms, clustering algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, artificial neural network algorithms, and the like. Additional or alternative machine learning algorithms may be used without departing from the disclosure.

FIGS. 2A-2G depict one example illustrative event sequence for distributed AI workload optimization in accordance with one or more aspects described herein. The events shown in the illustrative event sequence are merely one example sequence and additional events may be added, or events may be omitted, without departing from the disclosure. Further, one or more processes discussed with respect to FIGS. 2A-2G may be performed in real-time or near real-time.

Figure 2A:
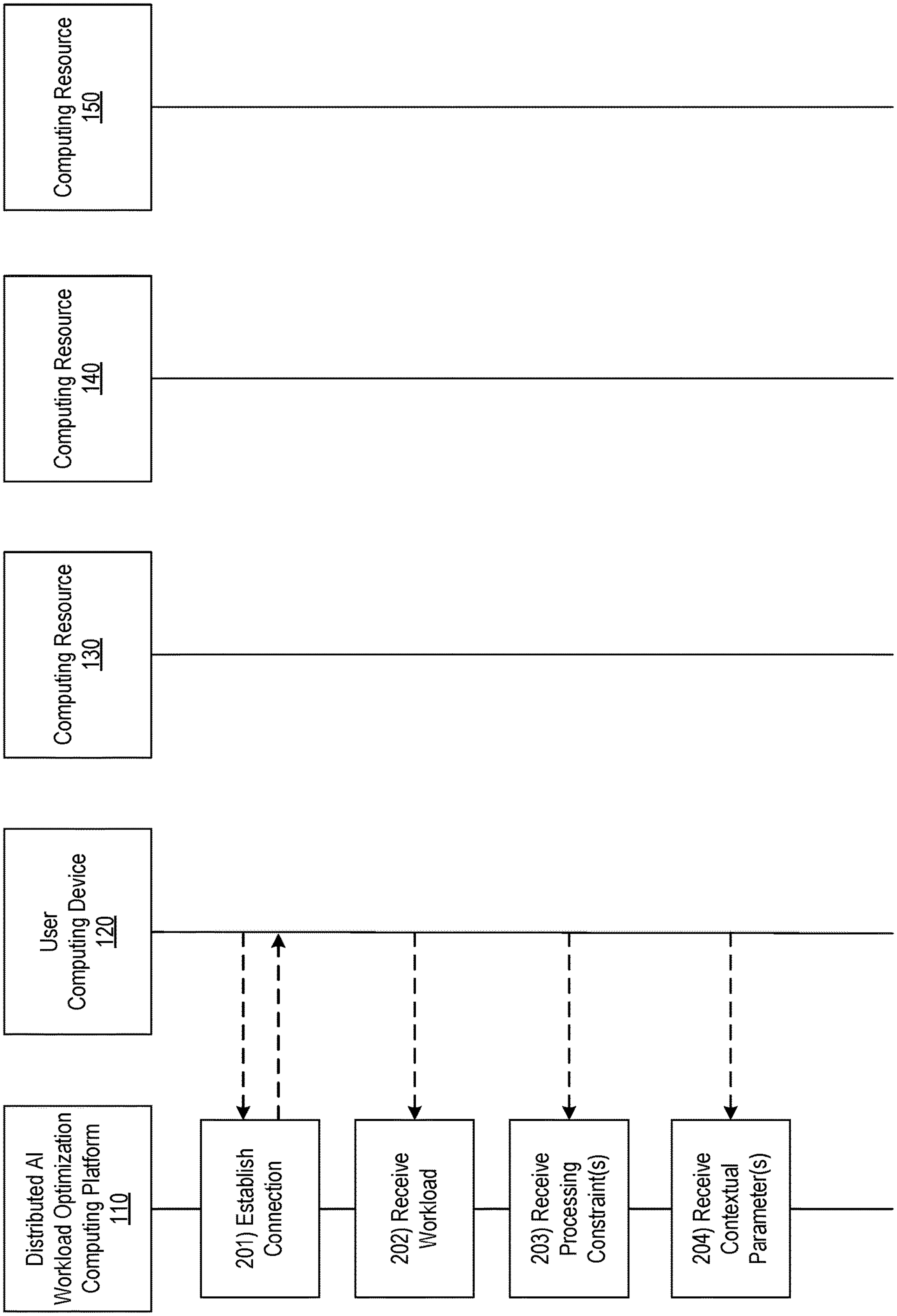
FIGS. 2A-2G depict an illustrative event sequence for distributed AI workload optimization in accordance with one or more arrangements discussed herein.

With reference to FIG. 2A, at step 201, user computing device 120 may connect to distributed AI workload optimization computing platform 110. For instance, a first wireless connection may be established between user computing device 120 and distributed AI workload optimization computing platform 110. Upon establishing the first wireless connection, a communication session may be initiated between user computing device 120 and distributed AI workload optimization computing platform 110.

At step 202, distributed AI workload optimization computing platform 110 may receive a workload (e.g., a job request or computational task). A workload may indicate an amount of computing resources and/or time it takes to complete a task or generate an outcome. For instance, a workload requiring a number of central processing unit (CPU) or graphics processing unit (GPU) cycles may be submitted to distributed AI workload optimization computing platform 110. In some embodiments, distributed AI workload optimization computing platform 110 may partition a task (e.g., a complex task) into smaller tasks that can be optimized for distribution.

At step 203, distributed AI workload optimization computing platform 110 may receive, from a computing device associated with a user (e.g., user computing device 120), one or more processing constraints. In some examples, the one or more processing constraints may include a time interval and/or a target budget for completion of the task (e.g., by the end of the month but staying under a cost budget, or a lowest price within a specific amount of time). In some examples, the one or more processing constraints may include business, managerial, departmental, or budget requirements. In some examples, the one or more processing constraints may include a regulatory requirement associated with the task (e.g., ensuring that vendors are compliant with data protection requirements). Distributed AI workload optimization computing platform 110 may receive the processing constraints before (e.g., serially) and/or during (e.g., in parallel with) execution of a workload or job (e.g., as adjustments are made to the constraints).

At step 204, distributed AI workload optimization computing platform 110 may receive one or more contextual parameters associated with the workload (e.g., from user computing device 120 or from another source). In some examples, the one or more contextual parameters associated with the workload may include contextually generated content such as geographic information, weather or environmental related information, historical/factual information, temporal information, stock market information, and/or the like. In one non-limiting example, if there is an impending storm or other major weather event that is expected to cause server outages in a particular area, distributed AI workload optimization computing platform 110 may receive that contextual information and later utilize that information to adjust/redistribute workloads to other geographic areas to keep the processing running smoothly and efficiently, and avoid server downtime or outage issues. Distributed AI workload optimization computing platform 110 may receive the contextual parameters before (e.g., serially) and/or during (e.g., in parallel with) execution of a workload or job (e.g., as adjustments are made to the constraints).

Figure 2B:
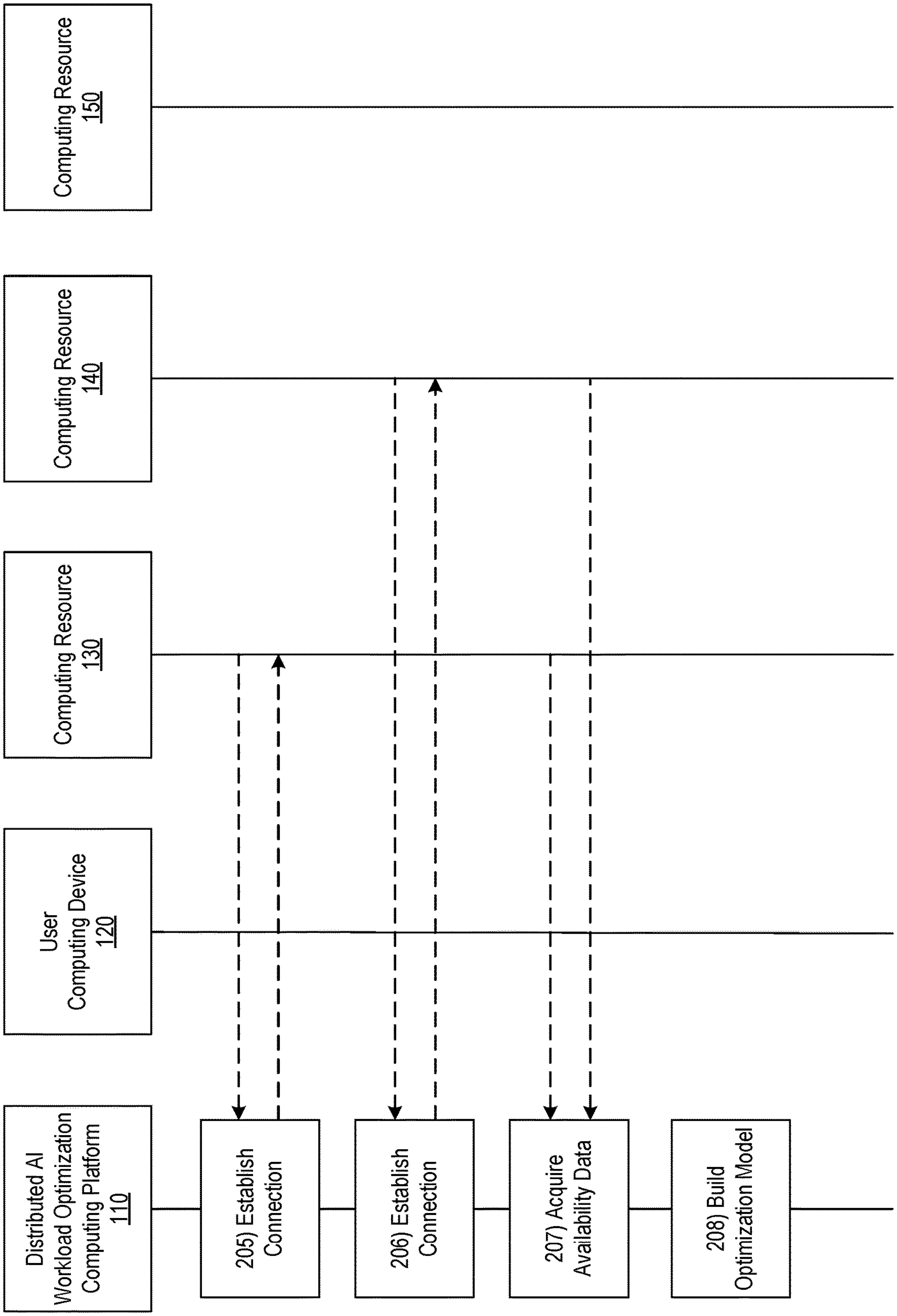

With reference to FIG. 2B, at step 205, distributed AI workload optimization computing platform 110 may connect to computing resource 130. For instance, a second wireless connection may be established between distributed AI workload optimization computing platform 110 and computing resource 130. Upon establishing the second wireless connection, a communication session may be initiated between distributed AI workload optimization computing platform 110 and computing resource 130.

At step 206, distributed AI workload optimization computing platform 110 may connect to computing resource 140. For instance, a third wireless connection may be established between distributed AI workload optimization computing platform 110 and computing resource 140. Upon establishing the third wireless connection, a communication session may be initiated between distributed AI workload optimization computing platform 110 and computing resource 140.

At step 207, distributed AI workload optimization computing platform 110 may acquire availability data for a plurality of resources in a distributed computing environment. In addition, each of the plurality of resources may be capable of performing at least part of the workload. In acquiring the availability data for the plurality of resources, distributed AI workload optimization computing platform 110 may identify resources, of the plurality of resources (e.g., computing resource 130, computing resource 140, computing resource 150, and the like), that are not being utilized (e.g., by other applications or other users), are underutilized, idle, or not efficiently utilized (e.g., underutilized systems that have various down times), and therefore, could be used to complete the job. In some examples, the availability data may include information relating to processing power, memory capability, network bandwidth, and/or the like. Availability/vendor data may be obtained through various provider interfaces. Two types of availability/vendor data might include on-demand server instances and ad-hoc type availability. On-demand instances allow users to pay for compute capacity by the hour/second. For example, an on-demand model might indicate that a certain type of system, at a particular time, is a particular cost. A user can provision that particular instance at a particular price point until they reach a certain threshold where the cost may go up (e.g., the cost may fluctuate). For instance, a user might be willing to pay up to two dollars and fifty cents an hour to complete a task with no particular end date. In such a case, distributed AI workload optimization computing platform 110 may run in the background and work towards completing a task when the price makes sense (e.g., is below a certain budget constraint).

At step 208, based on the one or more processing constraints, the one or more contextual parameters, and the availability data, distributed AI workload optimization computing platform 110 may build, using an AI/ML algorithm, an optimization model for distributing the workload. In addition, the optimization model may optimize distribution of available resources of the plurality of resources allocated to executing the workload. For instance, distributed AI workload optimization computing platform 110 may generate, based on an AI/ML model, a set of possible configurations (e.g., using distributed GPU models). The optimization model may include constraints such that the generated configurations would meet the constraints. In some embodiments, the distributed AI workload optimization computing platform 110 may, based on a type of the task, assign and apply weights to the optimization model to emphasize a selection of a central processing unit or a graphical processing unit for completing the task. For example, the optimization model might be optimized for GPU cloud computing since GPUs may perform certain tasks better than non-GPUs (e.g., CPUs), and therefore, weights maybe incorporated into the optimization model to specify this preference. For instance, GPU cloud computing may be used to offload processing needs from a CPU, and can be used for some special purpose application or computational tasks.

Figure 2C:
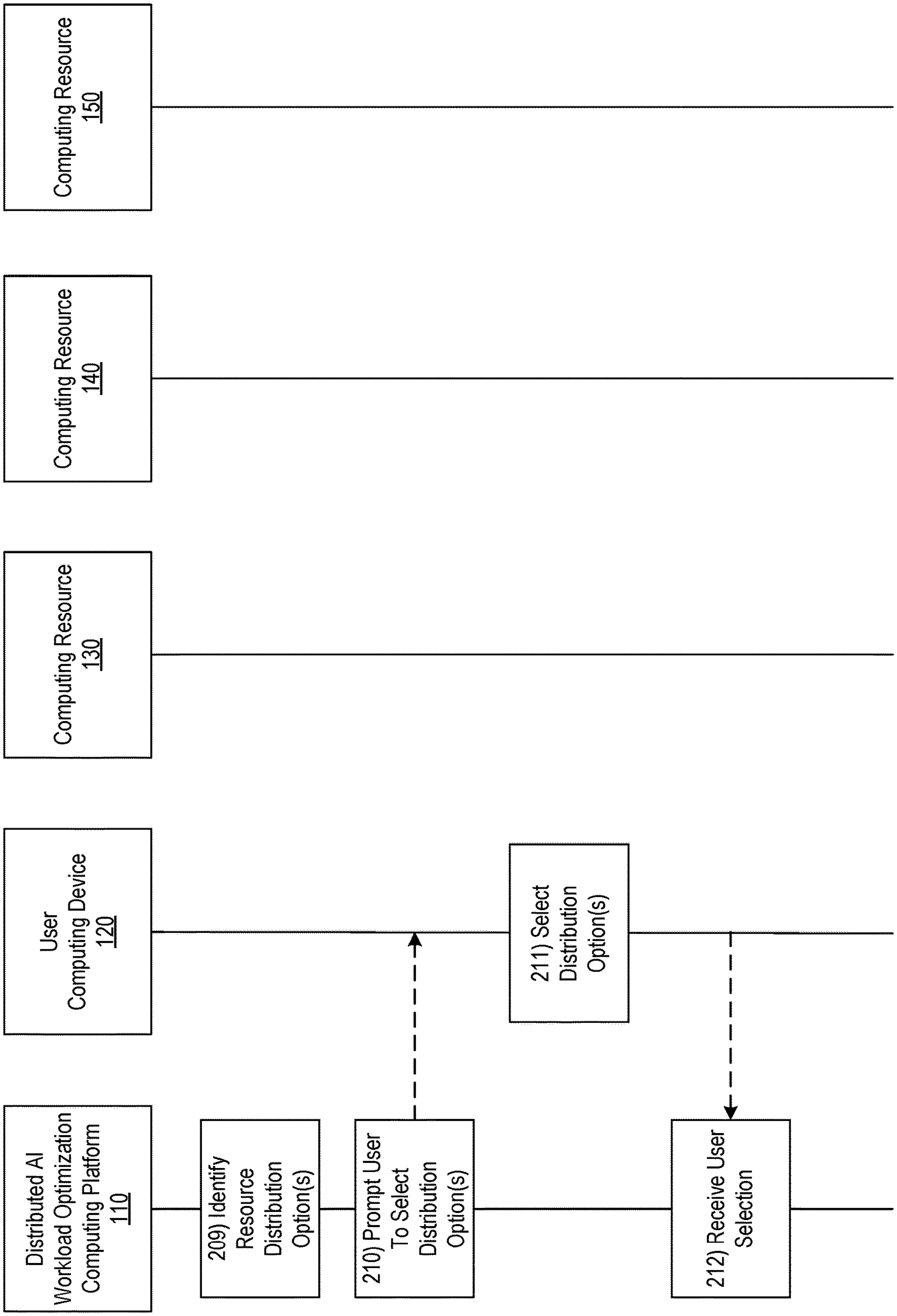

With reference to FIG. 2C, at step 209, based on the optimization model, the distributed AI workload optimization computing platform 110 may identify one or more resource distribution options (e.g., including an optimal distribution of the available resources for executing the workload). For example, one distribution option might suggest distributing fifty percent of a task to a first vendor, and fifty percent of the task to an on-site premise in order to complete a workload within a first budget and a first time period, and another distribution option might suggest distributing a different percentage the task the first vendor and a remaining percentage of the task to a third vendor in order to complete the workload within a second budget and within a second time period.

Figure 3:
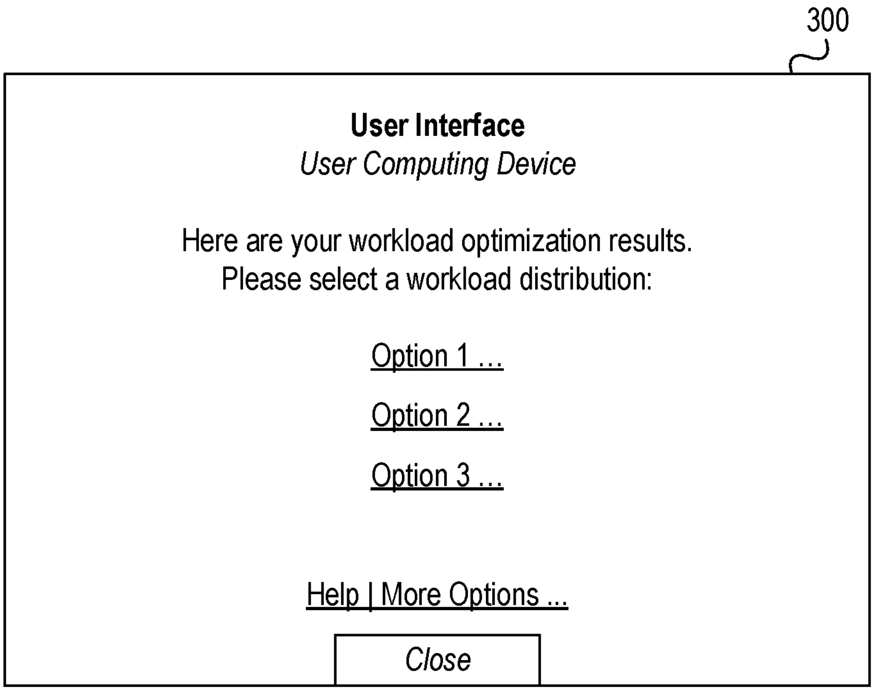
FIGS. 3 and 4 depict example graphical user interfaces for distributed AI workload optimization in accordance with one or more arrangements discussed herein.

In some examples, at step 210, the distributed AI workload optimization computing platform 110 may prompt a user of the computing device (e.g., user computing device 120) to select one of the identified one or more resource distribution options. In some examples, distributed AI workload optimization computing platform 110 may output various options and/or one best option. The user of the computing device (e.g., user computing device 120) may be presented with the options, which the user may choose from. In some examples, the user may override what might be considered by the distributed AI workload optimization computing platform 110 to be the best or optimized distribution (e.g., a user might choose one vendor over another based on having greater familiarity with that vendor). For instance, the user computing device (e.g., user computing device 120) may display and/or otherwise present one or more graphical user interfaces similar to graphical user interface 300, which is illustrated in FIG. 3. As shown in FIG. 3, graphical user interface 300 may include text and/or other information associated with a workload distribution (e.g., "Here are your workload optimization results. Please select a workload distribution. [Option 1 . . . ] [Option 2 . . . ] [Option 3 . . . ]"). It will be appreciated that other and/or different notifications may also be provided.

Returning to FIG. 2C, at step 211, the user of the computing device (e.g., user computing device 120) may select one of the identified one or more resource distribution options. At step 212, distributed AI workload optimization computing platform 110 may receive the user selection.

Figure 2D:
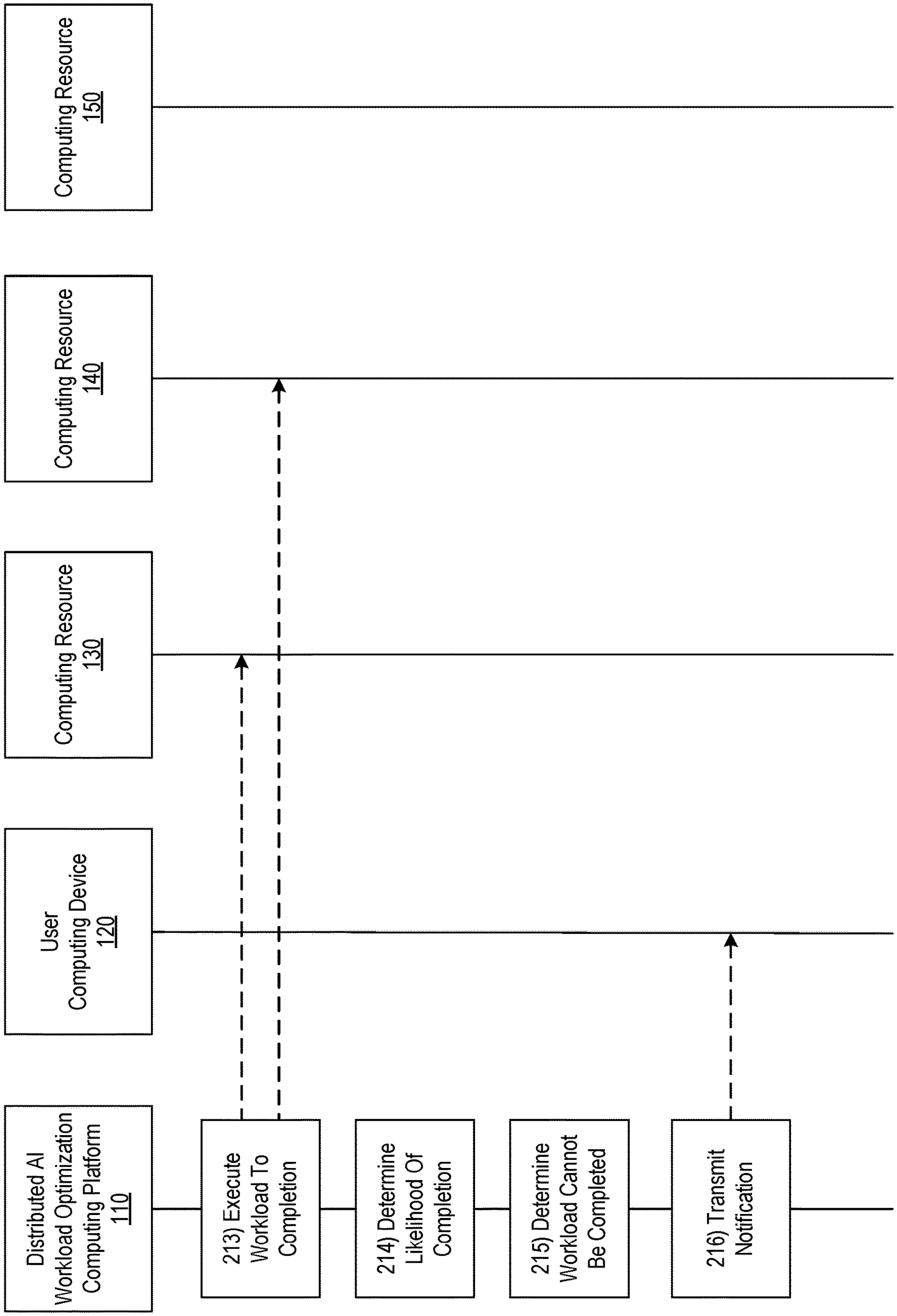

With reference to FIG. 2D, at step 213, distributed AI workload optimization computing platform 110 may execute the workload to completion based on the identified one or more resource distribution options. In some examples, distributed AI workload optimization computing platform 110 may execute the workload based on the received user selection (e.g., at step 212). For instance, distributed AI workload optimization computing platform 110 may partition the job and send it to the computing resources associated with the identified one or more resource distribution options (e.g., computing resource 130, computing resource 140).

In some examples, steps 210 through 212 may be skipped, and distributed AI workload optimization computing platform 110 may automatically execute the optimized distribution without user selection.

In some embodiments, at step 214, distributed AI workload optimization computing platform 110 may determine a likelihood of completion or a degree of completion of the workload within the one or more processing constraints.

In some examples, at step 215, distributed AI workload optimization computing platform 110 might determine that the workload cannot be completed within the one or more processing constraints. Non-limiting examples of such workloads might include a generation of prime numbers or a computational task that is limited by budget constraints.

Figure 2E:
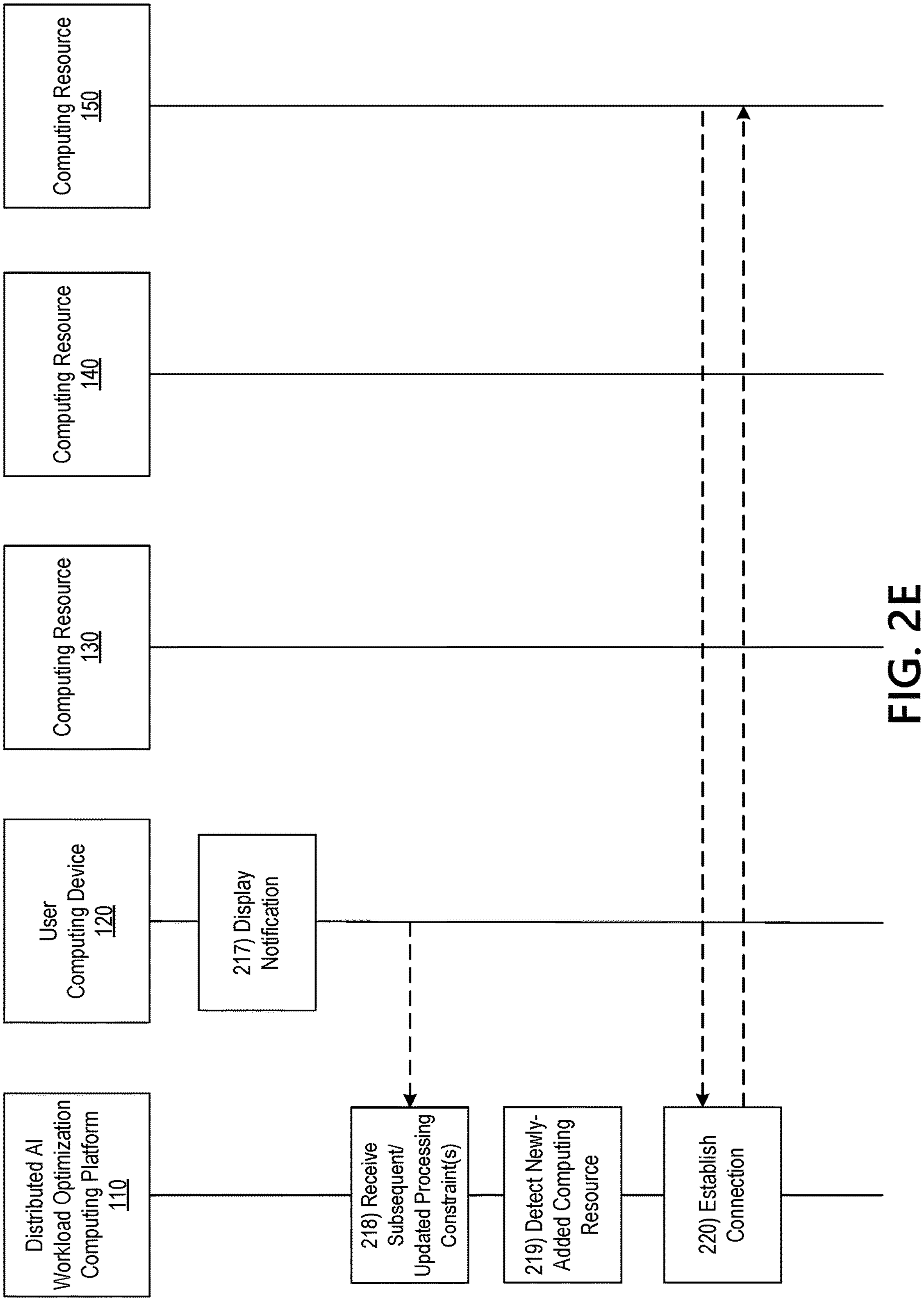
Figure 4:
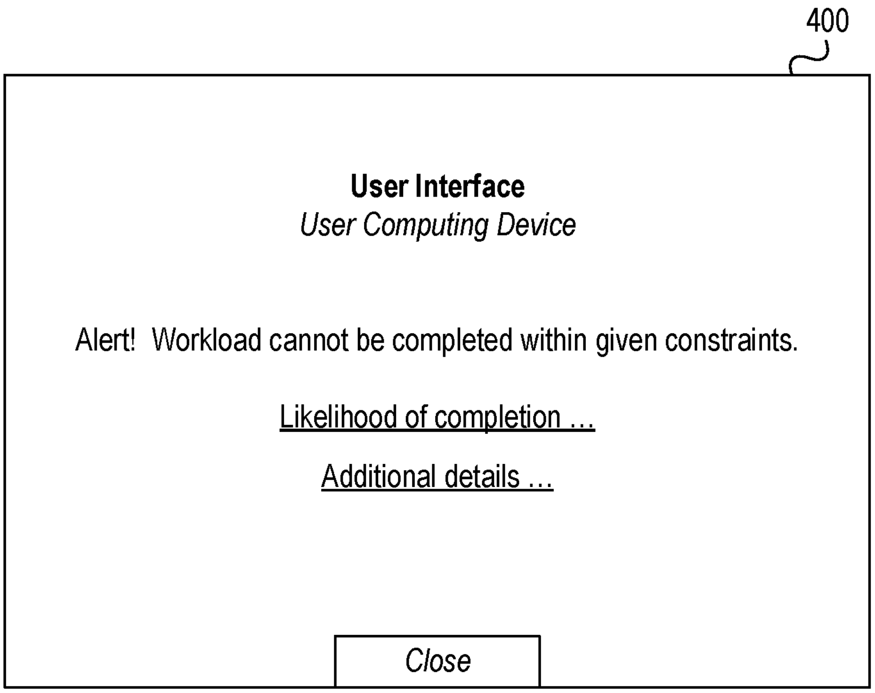

In turn, at step 216, distributed AI workload optimization computing platform 110 may transmit a notification to the computing device associated with a user indicating the likelihood of completion or a degree of completion of the workload outside the one or more processing constraints. For instance, distributed AI workload optimization computing platform 110 might indicate, with respect to a computational task, a likelihood of providing a solution or the number of values it would be able to obtain within the given processing constraints. For instance, the user computing device (e.g., user computing device 120) may display and/or otherwise present one or more graphical user interfaces similar to graphical user interface 400, which is illustrated in FIG. 4. As shown in FIG. 4, graphical user interface 400 may include text and/or other information associated with executing the workload (e.g., "Alert! Workload cannot be completed within given constraints. [Likelihood of completion . . . ] [Additional details . . . ]"). It will be appreciated that other and/or different notifications may also be provided. With reference to FIG. 2E, at step 217, the user computing device (e.g., user computing device 120) may receive and display the notification.

In some embodiments, at step 218, distributed AI workload optimization computing platform 110 may receive updated processing constraints (e.g., from user computing device 120). Responsive to receiving the updated processing constraints, distributed AI workload optimization computing platform 110 may save the current state and adjust a configuration to meet new requirements/constraints provided (e.g., by a user or organization).

Additionally or alternatively, data centers, clusters, and/or cloud providers may be added to the computing environment 100 at any time and distributed AI workload optimization computing platform 110 may make adjustments to the available resources. For example, at step 219, distributed AI workload optimization computing platform 110 may detect one or more newly-added resources in the distributed computing environment. For example, distributed AI workload optimization computing platform 110 may detect newly-added computing resource 150.

At step 220, distributed AI workload optimization computing platform 110 may connect to computing resource 150. For instance, a fourth wireless connection may be established between distributed AI workload optimization computing platform 110 and computing resource 150. Upon establishing the fourth wireless connection, a communication session may be initiated between distributed AI workload optimization computing platform 110 and computing resource 150.

Figure 2F:
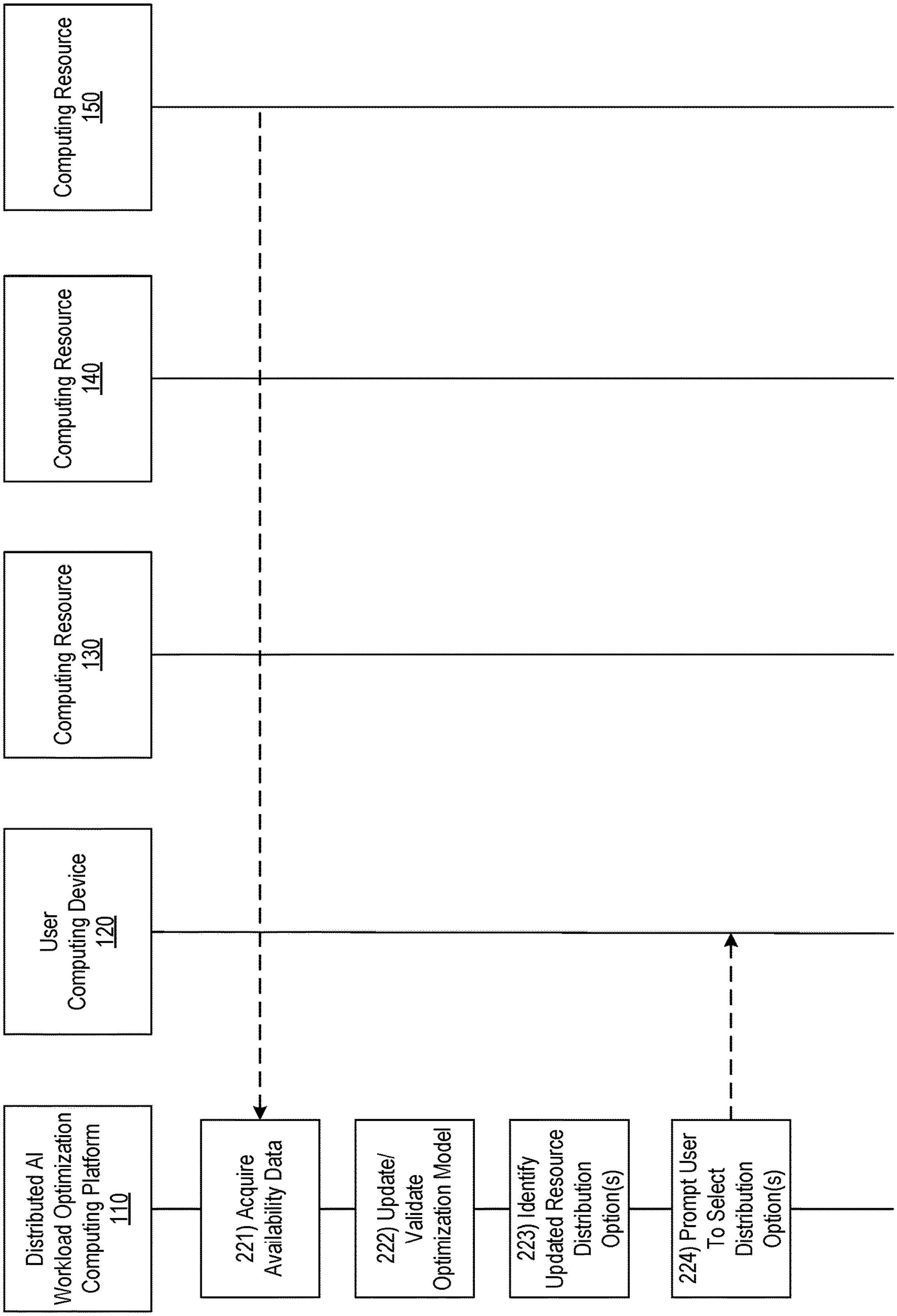

With reference to FIG. 2F, at step 221, distributed AI workload optimization computing platform 110 may acquire updated availability data for the one or more newly added resources. Each of the one or more newly-added resources may be capable of performing at least part of the workload.

At step 222, distributed AI workload optimization computing platform 110 may update/validate the optimization model for distributing the workload (e.g., based on the one or more updated processing constraints and/or the one or more newly-added resources).

At step 223, based on the updated optimization model, distributed AI workload optimization computing platform 110 may modify the one or more resource allocation options including the optimal combination of available resources for executing the workload.

In some examples, at step 224, the distributed AI workload optimization computing platform 110 may prompt a user of the computing device (e.g., user computing device 120) to select one of the identified one or more updated resource distribution options. For instance, the user computing device (e.g., user computing device 120) may display and/or otherwise present one or more graphical user interfaces similar to graphical user interface 300, which is illustrated in FIG. 3, as discussed above.

Figure 2G:
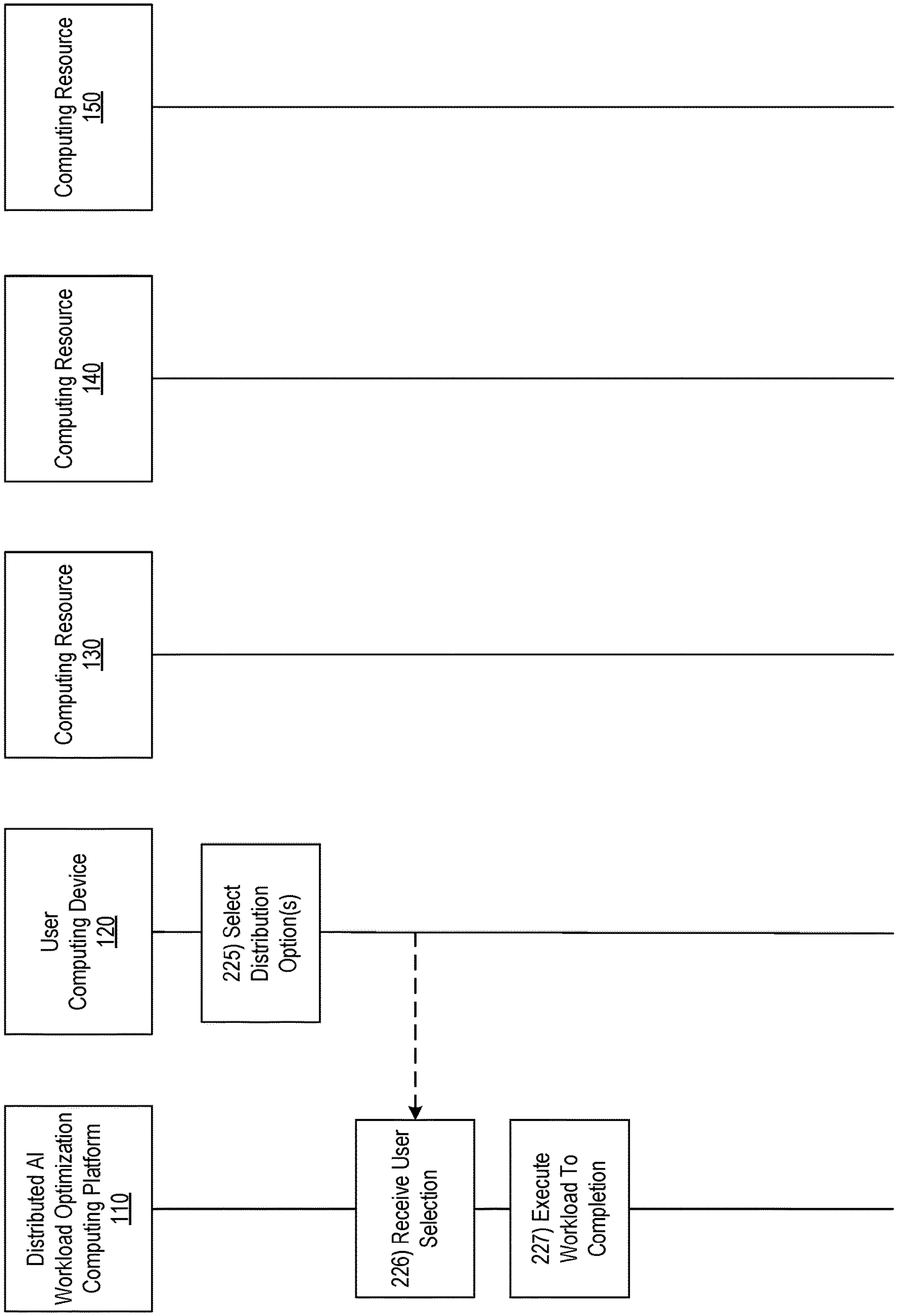

With reference to FIG. 2G, at step 225, the user of the computing device (e.g., user computing device 120) may select one of the identified one or more updated resource distribution options. At step 226, distributed AI workload optimization computing platform 110 may receive the user selection.

At step 227, distributed AI workload optimization computing platform 110 may execute the workload to completion based on the identified one or more updated resource distribution options. For example, distributed AI workload optimization computing platform 110 may adjust processing of the workload based on the one or more updated resource allocation options. A computational task may therefore be carried out or solved in the most efficient manner possible given current resourcing.

In some examples, steps 224 through 226 may be skipped, and distributed AI workload optimization computing platform 110 may automatically execute the optimized distribution without user selection.

Figure 5:
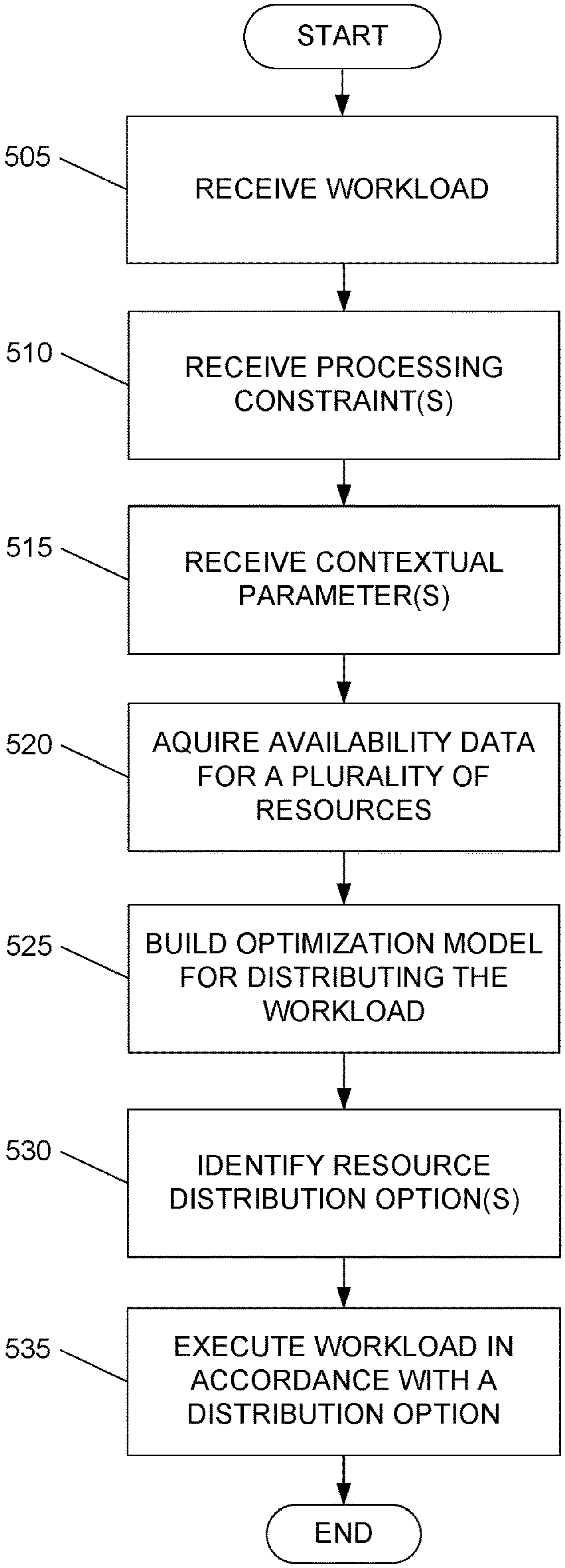
FIG. 5 depicts an illustrative method for distributed AI workload optimization in accordance with one or more arrangements discussed herein.

FIG. 5 depicts an illustrative method for distributed AI workload optimization in accordance with one or more example embodiments. With reference to FIG. 5, at step 505, a computing platform having at least one processor, a communication interface, and memory may receive a workload. In addition, the workload may identify a number of computer processing cycles required to complete a task. At step 510, the computing platform may receive, from a computing device associated with a user, one or more processing constraints. At step 515, the computing platform may receive one or more contextual parameters associated with the workload. At step 520, the computing platform may acquire availability data for a plurality of resources in a distributed computing environment. In addition, each of the plurality of resources may be capable of performing at least part of the workload. At step 525, based on the one or more processing constraints, the one or more contextual parameters, and the availability data, the computing platform may build, using an artificial intelligence algorithm, an optimization model for distributing the workload. In addition, the optimization model may optimize distribution of available resources of the plurality of resources allocated to executing the workload. At step 530, based on the optimization model, the computing platform may identify one or more resource distribution options including an optimal distribution of the available resources for executing the workload. At step 535, the computing platform may execute the workload based on the identified one or more resource distribution options.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, cause the computing platform to:

receive a workload, wherein the workload identifies a number of computer processing cycles required to complete a task;

receive, from a computing device associated with a user, one or more processing constraints;

receive contextual parameters associated with the workload, wherein the contextual parameters include geographic information, weather related information, historical information, temporal information, and stock market information;

acquire availability data for a plurality of resources in a distributed computing environment, wherein each of the plurality of resources is capable of performing at least part of the workload;

based on the one or more processing constraints, the contextual parameters, and the availability data, build, using an artificial intelligence algorithm, an optimization model for distributing the workload, wherein the optimization model optimizes distribution of available resources of the plurality of resources allocated to executing the workload;

based on the optimization model, identify one or more resource distribution options including an optimal distribution of the available resources for executing the workload; and execute the workload based on the identified one or more resource distribution options;

detect one or more newly-added resources in the distributed computing environment during execution of the workload;

acquire updated availability data for the one or more newly-added resources;

update the optimization model based on the updated availability data;

based on the updated optimization model, modify the one or more resource distribution options;

prompt a user of the computing device to select one of the modified one or more resource distribution options; and adjust execution of the workload based on the selection by the user of the computing device.

2. The computing platform of claim 1, wherein acquiring the availability data for the plurality of resources includes identifying resources, of the plurality of resources, that are not being utilized.

3. The computing platform of claim 1, wherein the computer processing cycles include processing cycles of a central processing unit or processing cycles of a graphical processing unit.

4. The computing platform of claim 1, wherein the one or more processing constraints includes a time interval and a target budget for completion of the task.

5. The computing platform of claim 1, wherein the one or more processing constraints includes a regulatory requirement associated with the task.

6. The computing platform of claim 1, wherein the contextual parameters associated with the workload further include an impending storm or other major weather event expected to cause server outages in a particular area.

7. The computing platform of claim 1, further including instructions that, when executed, cause the computing platform to:

based on a type of the task, assign and apply weights to the optimization model to emphasize a selection of a central processing unit or a graphical processing unit for completing the task.

8. The computing platform of claim 1, further including instructions that, when executed, cause the computing platform to:

determine a likelihood of completion of the workload within the one or more processing constraints;

determine that the workload cannot be completed within the one or more processing constraints; and transmit a notification to the computing device associated with a user indicating the likelihood of completion of the workload outside the one or more processing constraints.

9. The computing platform of claim 1, further including instructions that, when executed, cause the computing platform to:

prompt a user of the computing device to select of one of the identified one or more resource distribution options; and execute the workload based on the selection by the user of the computing device.

10. A method, comprising:

at a computing platform comprising at least one processor, a communication interface, and memory:

receiving, by the at least one processor, a workload, wherein the workload identifies a number of computer processing cycles required to complete a task;

receiving, by the at least one processor, from a computing device associated with a user, one or more processing constraints;

receiving, by the at least one processor, contextual parameters associated with the workload, wherein the contextual parameters include geographic information, weather related information, historical information, temporal information, and stock market information;

acquiring, by the at least one processor, availability data for a plurality of resources in a distributed computing environment, wherein each of the plurality of resources is capable of performing at least part of the workload;

based on the one or more processing constraints, the contextual parameters, and the availability data, building, by the at least one processor, using an artificial intelligence algorithm, an optimization model for distributing the workload, wherein the optimization model optimizes distribution of available resources of the plurality of resources allocated to executing the workload;

based on the optimization model, identifying, by the at least one processor, one or more resource distribution options including an optimal distribution of the available resources for executing the workload; and executing, by the at least one processor, the workload based on the identified one or more resource distribution options;

detecting, by the at least one processor, one or more newly-added resources in the distributed computing environment during execution of the workload;

acquiring, by the at least one processor, updated availability data for the one or more newly-added resources;

updating, by the at least one processor, the optimization model based on the updated availability data;

based on the updated optimization model, modifying, by the at least one processor, the one or more resource distribution options;

prompting, by the at least one processor, a user of the computing device to select one of the modified one or more resource distribution options; and adjusting, by the at least one processor, execution of the workload based on the selection by the user of the computing device.

11. The method of claim 10, wherein acquiring the availability data for the plurality of resources includes identifying resources, of the plurality of resources, that are not being utilized.

12. The method of claim 10, wherein the computer processing cycles include processing cycles of a central processing unit or processing cycles of a graphical processing unit.

13. The method of claim 10, wherein the one or more processing constraints includes a time interval and a target budget for completion of the task.

14. The method of claim 10, wherein the one or more processing constraints includes a regulatory requirement associated with the task.

15. The method of claim 10, wherein the contextual parameters associated with the workload further include an impending storm or other major weather event expected to cause server outages in a particular area.

16. The method of claim 10, further comprising:

based on a type of the task, assign and apply, by the at least one processor, weights to the optimization model to emphasize a selection of a central processing unit or a graphical processing unit for completing the task.

17. The method of claim 10, further comprising:

determining, by the at least one processor, a likelihood of completion of the workload within the one or more processing constraints;

determining, by the at least one processor, that the workload cannot be completed within the one or more processing constraints; and transmitting, by the at least one processor, a notification to the computing device associated with a user indicating the likelihood of completion of the workload outside the one or more processing constraints.

18. The method of claim 10, further comprising:

prompting, by the at least one processor, a user of the computing device to select one of the identified one or more resource distribution options; and executing, by the at least one processor, the workload based on the selection by the user of the computing device.

19. One or more non-transitory computer-readable media storing instructions that, when executed by a computing platform comprising at least one processor, memory, and a communication interface, cause the computing platform to:

receive a workload, wherein the workload identifies a number of computer processing cycles required to complete a task;

receive, from a computing device associated with a user, one or more processing constraints;

receive contextual parameters associated with the workload, wherein the contextual parameters include geographic information, weather related information, historical information, temporal information, and stock market information;

acquire availability data for a plurality of resources in a distributed computing environment, wherein each of the plurality of resources is capable of performing at least part of the workload;

based on the one or more processing constraints, the contextual parameters, and the availability data, build, using an artificial intelligence algorithm, an optimization model for distributing the workload, wherein the optimization model optimizes distribution of available resources of the plurality of resources allocated to executing the workload;

based on the optimization model, identify one or more resource distribution options including an optimal distribution of the available resources for executing the workload; and execute the workload based on the identified one or more resource distribution options;

detect one or more newly-added resources in the distributed computing environment during execution of the workload;

acquire updated availability data for the one or more newly-added resources;

update the optimization model based on the updated availability data;

based on the updated optimization model, modify the one or more resource distribution options;

prompt a user of the computing device to select one of the modified one or more resource distribution options; and adjust execution of the workload based on the selection by the user of the computing device.

20. The one or more non-transitory computer-readable media of claim 19, wherein acquiring the availability data for the plurality of resources includes identifying resources, of the plurality of resources, that are not being utilized.

* * * * *